United States Patent [19]

Kobayashi

[11] Patent Number: 5,628,809
[45] Date of Patent: May 13, 1997

[54] GLASSMELTING METHOD WITH REDUCED VOLATILIZATION OF ALKALI SPECIES

[75] Inventor: Hisashi Kobayashi, Putnam Valley, N.Y.

[73] Assignee: Praxair Technology, Inc., Danbury, Conn.

[21] Appl. No.: 489,911

[22] Filed: Jun. 13, 1995

[51] Int. Cl.$^6$ .................................................. C03B 5/225
[52] U.S. Cl. ...................... 65/134.4; 65/32.1; 65/134.1; 65/157
[58] Field of Search .............................. 65/134.4, 134.6, 65/135.1, 135.9, 157, 32.1, 32.5, 134.1

[56] References Cited

U.S. PATENT DOCUMENTS

| | | | |
|---|---|---|---|
| 2,274,643 | 3/1942 | Adams | 49/77 |
| 3,350,185 | 10/1967 | Rough | 65/134.4 X |
| 4,473,388 | 9/1984 | Lauwers | 65/134 |
| 4,599,100 | 7/1986 | Demarest, Jr. | 65/134.4 |
| 4,911,744 | 3/1990 | Petersson et al. | 65/134.4 |
| 4,957,050 | 9/1990 | Ho | 110/346 |
| 4,973,346 | 11/1990 | Kobayashi | 65/135 |
| 5,076,779 | 12/1991 | Kobayashi | 431/5 |
| 5,147,438 | 9/1992 | Castelain et al. | 65/135 |
| 5,176,086 | 1/1993 | Clark et al. | 110/346 |
| 5,346,524 | 9/1994 | Shamp et al. | 65/134.4 |

*Primary Examiner*—Donald E. Czaja
*Assistant Examiner*—Sean Vincent
*Attorney, Agent, or Firm*—Stanley Ktorides

[57] ABSTRACT

A glassmelting method wherein fuel and oxidant combust in a combustion zone in the upper level of a furnace and shield oxygen is passed over the molten glass surface at a low velocity to form a shield layer between the combustion zone and the molten glass, to counteract the reaction of water vapor, resulting from the combustion, with species within the molten glass, to reduce volatilization of alkali species from the molten glass, and to make the molten glass more oxidizing. Reducing gas may be used in place of shield oxygen to make the molten glass more reducing. Both shield oxygen and reducing gas may be used sequentially in a multi-zone furnace.

9 Claims, 1 Drawing Sheet

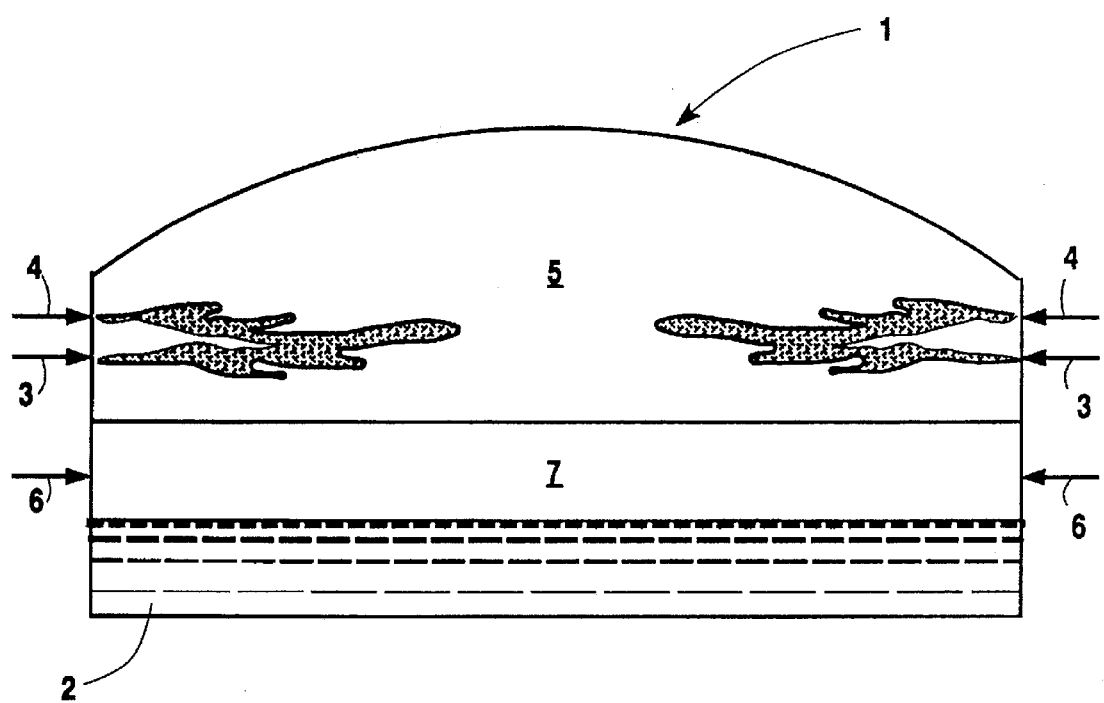

GLASSMELTING METHOD WITH REDUCED VOLATILIZATION OF ALKALI SPECIES

TECHNICAL FIELD

This invention relates generally to glassmaking and more particularly to the melting step in the glassmaking process wherein glassmaking materials are heated and melted to form molten glass.

BACKGROUND ART

In the making of glass, glassmaking materials are provided into a glassmelting furnace and melted into molten glass which is then poured into molds to produce products such as, for example, glass bottles. The glassmaking materials include batch oxidizers such as salt cake (calcium sulfate, $CaSO_4$) and niter (sodium nitrate, $NANO_3$, and potassium nitrate, $KNO_3$) in order to control the redox state of the glass.

The reaction of the oxidizers with the molten glass results in the generation of sulfur oxides (SOx) and nitrogen oxides (NOx) which are significant pollutants.

The glassmaking materials are melted in the furnace by heat provided by the combustion of fuel and oxidant. The combustion reaction also generates combustion reaction products which include primarily water vapor and carbon dioxide but also may include carbon monoxide, nitrogen, unburned or incompletely burned fuel, and oxygen. Water vapor resulting from the combustion reacts with alkali oxides in the molten glass to form alkali hydroxides which vaporize out from the molten glass. These alkali hydroxides, such as sodium hydroxide, NaOH, react with furnace refractory walls and cause refractory corrosion, and, further react in the flue passage after the furnace with sulfur dioxide, $SO_2$, and oxygen to form sodium sulfate, $Na_2SO_4$, and other sulfate and sulfite compounds which form particulates and often require expensive electrostatic precipitators or baghouses to ensure that they are not emitted to the atmosphere.

It would be very desirable to provide a glassmelting method wherein volatilization of alkali species is reduced and the generation of particulates, SOx and NOx is reduced so that electrostatic precipitators or baghouses need not be employed while still meeting environmentally safe levels of particulate and other emissions.

Accordingly it is an object of this invention to provide a glassmelting method which can operate effectively without generating high levels of particulates, SOx and NOx.

It is another object of this invention to reduce the volatilization of batch oxidizers and other fining agents from the molten glass batch during glassmelting.

SUMMARY OF THE INVENTION

The above and other objects which will become apparent to one skilled in the art upon a reading of this disclosure are attained by the present invention which is:

A glassmelting method enabling reduced volatilization of alkali species comprising:

(A) providing glassmaking materials including alkali species into a glassmelting furnace;

(B) providing fuel and oxidant into the furnace, combusting them therein to generate heat and combustion reaction products including water vapor in a combustion zone within the furnace, and radiating heat from the combustion zone to the glassmaking materials to form molten glass;

(C) providing shield oxygen into the furnace at a velocity not exceeding 50 feet per second at a point between the combustion zone and the molten glass, and forming a shield oxygen layer between the combustion zone and the molten glass to shield the molten glass from the water vapor of the combustion reaction products; and (D) reacting some shield oxygen with molten glass to make the molten glass more oxidizing.

BRIEF DESCRIPTION OF THE DRAWING

The sole FIGURE is a simplified cross-sectional representation of one embodiment of a cross-fired furnace wherein the method of this invention may be practiced.

DETAILED DESCRIPTION

The invention will be described in detail with reference to the drawing. Referring now to the FIGURE, there is shown, in vertical cross-section, glassmelting furnace 1 into which glassmaking materials including alkali species are provided. The glassmaking materials may include one or more of sand, soda ash, limestone, dolomite, salt cake, niter, rouge and cullet or scrap glass. The glassmaking materials are melted as they pass through glassmelting furnace 1, i.e. as they flow toward the viewer in the illustration of the FIGURE, to form molten glass 2 within furnace 1.

Fuel 3 and oxidant 4 are provided into furnace 1. The fuel and oxidant may be provided separately into furnace 1, as illustrated in the FIGURE, or may be provided together in a premixed condition. Examples of suitable fuels which may be used in the practice of the method of this invention include methane, natural gas, oil and hydrogen. The oxygen may be provided in the form of air, or a fluid having an oxygen concentration which exceeds that of air. Preferably the oxygen is provided in the form of a fluid having an oxygen concentration of at least 30 mole percent, most preferably at least 80 mole percent. The oxygen may, if desired, be provided in the form of commercially pure oxygen. Preferably the fuel and oxidant are provided into the glassmelting furnace in a fuel-rich or substoichiometric ratio, generally within the range of from 5 to 80 percent of stoichiometric. The fuel-rich ratio enables the combustion to be carried out without significant NOx generation. When the fuel and oxidant are provided into the furnace in a substoichiometric ratio, the remaining oxygen required to completely combust the fuel is provided by the shield oxygen as will be described later.

The fuel and oxidant combust within furnace 1 to generate heat and combustion reaction products. The fuel and oxidant are provided into the furnace at a relatively elevated position and at a low mass average velocity, preferably less than 50 feet per second (fps), most preferably less than 10 fps, and form combustion zone 5 within the furnace. Combustion zone 5 comprises fuel, oxidant and combustion reaction products, i.e. water vapor and carbon dioxide. The combustion reaction products may also comprise carbon monoxide and partially combusted hydrocarbons.

Shield oxygen 6 is provided into furnace 1 at a point between combustion zone 5 and molten glass 2 to form shield oxygen layer 7 between combustion zone 5 and molten glass 7. The shield oxygen is preferably in the form of a fluid having an oxygen concentration of 30 mole percent or more. Most preferably the shield oxygen is dry oxygen, containing at least 80 mole percent oxygen. Shield oxygen 6 is provided into furnace 1 at a velocity not exceeding 50 fps and preferably not exceeding 10 fps. The shield oxygen slowly flows upward to counter the diffusion of combustion reaction products and to provide, if needed, additional oxygen to complete the combustion. One or more flue ports are located in the upper portion of the furnace to exhaust the combustion reaction products.

Heat generated in combustion zone 5 radiates to the glassmaking materials to melt the glassmaking materials and form the molten glass. This heat radiates from combustion zone 5 to the glassmaking materials either directly through oxygen shield layer 7 or indirectly first to the refractory sidewalls of furnace 1 and then through oxygen shield layer 7 and to the glassmaking materials. Very little heat is passed from the combustion reaction to the glassmaking materials by convection. In conventional glassmelting practice, owing to the relatively high injection velocity of the fuel and oxidant into the furnace and the consequent mixing within the furnace, some portion of the heat generated by the combustion is passed to the glassmaking materials by convection of the combustion reaction products. The loss of convective heat transfer can be more than compensated for by a relatively small increase in the effective radiation temperature.

Volatilization of alkali compounds from the glass batch is a complex process involving heat and mass transfer, and chemical reactions. NaOH is the predominant sodium species in the glass furnace atmosphere and is formed mainly by the reactions of water vapor and sodium oxides in the molten glass and sodium carbonate in the batch. As the flue gas from the furnace cools down, NaOH vapor reacts with $SO_2$ and $O_2$ in the flue gas to form $Na_2SO_4$ which subsequently condenses to form submicron size particles in the stack. There is also some direct volatilization of $Na_2SO_4$ from the molten glass.

In natural gas fired glass furnaces, $SO_2$ emissions originate from the decomposition of batch sulfate materials used for fining. Stack emissions of $SO_2$ are influenced by many factors. Inside the hot glass furnace atmosphere, $SO_2$ is the predominant sulfur compound and $SO_3$ is not thermodynamically favored. As the flue gas cools down in the flue duct and stack, $SO_3$ and various sulfate compounds are formed, and emitted as sulfate or sulfite "particulates" as well as gaseous $SO_2$. NaOH vapor generated by reactive volatilization in the glass furnace readily reacts with $SO_2$ and $O_2$ in the flue ducts to form sulfate particles. In other words NaOH is an excellent scrubbing agent for $SO_2$. Hence, reduction of sodium volatilization in the glass furnace, which reduces particulate emissions, tends to increase $SO_2$ emission, if no other changes take place. In order to reduce the combined emissions of particulates and $SO_2$, the amount of sulfate materials mixed in the glass batch must be reduced while maintaining good fining reactions to eliminate bubbles from the glassmelt. For flint glass, roughly half the sulfur contained in the batch may be retained in the glass product as $SO_3$ and the remaining balance escapes into the furnace atmosphere as $SO_2$. Roughly half of the $SO_2$ produced in the glass furnace is considered to be generated in the batch melting area by dissociation or by reactions with carbon and other reducing species with batch sulfate. Since $SO_2$ and $O_2$ (or CO) generated in this step do not contribute to glass fining, creating a furnace atmosphere that enhances the dissolution and retention of sulfate in glass at this initial melting stage is desirable to reduce $SO_2$ emissions. Thermodynamically, high $O_2$ concentration in the atmosphere near the batch surface reduces dissociation of sulfate. Water vapor promotes the release of $SO_2$ emission. However, a substantial amount $CO_2$ is generated from the decomposition of soda ash in the batch melting zone, which tends to dilute the effects of the furnace atmosphere.

Niter contributes substantially to NOx emissions. The extent of destruction of NOx generated from batch niter depends on the furnace condition. The preferred approach is the reduction of niter used in the glass batch as it reduces the cost of the batch significantly. Since niter is used primarily as an oxidizer, it has to be substituted with an alternate oxidizer.

Herein lies a major benefit of the invention. The low velocity of the shield oxygen, coupled with the position at which it is provided into the furnace, forms relatively stagnant shield layer 7 which shields molten glass 2 from contact with a significant portion of the combustion reaction products resulting from the combustion of the fuel and oxidant. As a result, significantly less water vapor contacts the molten glass surface and reacts with alkali oxides in the molten glass than is the case with conventional glassmelting practice. Thus fewer alkali hydroxides are formed, ultimately resulting in significantly fewer particulates formed and, consequently, eliminating the need for electrostatic precipitators or baghouses for particulate emission control. Direct volatilization of glass fining agents and batch oxidizers is also reduced significantly due to the very low velocity of the shield oxygen.

The invention also has a second significant benefit. Because shield layer 7 comprises oxygen, some of the oxygen of the shield layer reacts with the molten glass to make the glass more oxidizing. This reduces the need for batch oxidizers, reducing the costs of the glassmelting operation, and also reducing the generation of SOx and NOx which result from the reaction of batch oxidizers with molten glass. The reduced SOx generation results in reduced SOx emissions. The reduced NOx generation is an added environmental benefit.

The shield oxygen will diffuse in combustion zone 5 and unburned and partially combusted fuel will diffuse into shield layer 7 thus serving to complete the combustion of the fuel in those cases where the fuel and oxidant are provided into the furnace in a fuel-rich ratio.

Preferably the gases in the furnace above molten glass 2 are exhausted from the furnace from a point above the point where shield oxygen is provided into the furnace. This assists in keeping significant water vapor from contacting the molten glass by helping the shield oxygen layer shield the molten glass. Most preferably the flow of shield oxygen over the molten glass surface is laminar.

The following test is reported to illustrate the effectiveness of the invention. It is not intended that this test be limiting. A test furnace 2'×2'×2' was used to establish the shielding effect of the invention. Natural gas at a flow rate of 100 standard cubic feet per hour (scfh) and commercially pure oxygen at a flowrate of 105 scfh were provided into the upper portion of the test furnace at a velocity of about 1.5 to 3 fps and combusted. This was at a stoichiometric ratio of about 50%. The balance of the oxygen was provided into the lower portion of the test furnace at a velocity of about 0.5 fps. Measurements the of oxygen and carbon dioxide concentration were taken next to the bottom of the furnace which represented the molten glass surface and the water vapor concentration was calculated by assuming that the $H_2O/CO_2$ ratio is 2. These results are reported in Table I as Test A. Calculated concentrations of $O_2$, $H_2O$ and $CO_2$ when all of the oxygen was passed into the upper portion of the test furnace are reported in Table I as Test B.

TABLE I

| TEST | CONCENTRATION (MOLE PERCENT) | | |
|---|---|---|---|
|  | $O_2$ | $H_2O$ | $CO_2$ |
| A | 72.2 | 18.5 | 9.2 |
| B | 2.0 | 65.3 | 32.7 |

This test demonstrates that the oxygen shield layer of the invention can effectively keep large amounts of water vapor generated from a combustion reaction from contacting molten glass.

Although the invention has been discussed for melting of oxidized glass, the process can be easily modified for melting of reduced glass. For example, reducing shield gas containing CO and $H_2$ can be used in place of shield oxygen. Such an atmosphere can be generated in-situ by using a shield gas mixture containing natural gas or other hydrocarbons and an oxidant such as air or oxygen. The stoichiometric ratio of the fuel and oxygen introduced for combustion is set to provide excess oxygen for complete combustion of the reducing species from the shield gas mixture before it is exhausted from the furnace. Dry air or inert gas such as nitrogen can be used as shielding gas for other glasses.

It is also possible to use more than one shielding gas within the same glass melting furnace to optimize the furnace operation. For example it is known that a reducing atmosphere containing CO or $H_2$ tends to clear out the foam generated on the molten glass surface. Excessive foams on the glass surface reduces heat transfer and promotes volatilization of alkali species and other fining agents. In such a case, a reducing shielding gas mixture is used for the glass surface zone susceptible to the foam problem and an oxidizing shield gas can be used in the other zones of the furnace.

Now by the use of this invention one can carry out glassmelting with significantly reduced emission of pollutants resulting from the reaction of water vapor with alkali oxides in the molten glass and from the reaction of batch oxidizers with molten glass.

Although the invention has been discussed in detail with reference to certain embodiments, those skilled in the art will recognize that there are other embodiments of the invention within the spirit and the scope of the claims.

I claim:

1. A glassmelting method enabling reduced volatilization of alkali species comprising:

A) providing glassmaking materials including alkali species into a glassmelting furnace;

B) providing fuel and oxidant into the furnace, combusting them therein to generate heat and combustion reaction products including water vapor in a combustion zone within the furnace, and radiating heat from the combustion reaction products to the glassmaking materials to form molten glass;

C) providing shield oxygen into the furnace at a velocity not exceeding 50 feet per second at a point between the combustion zone and the molten glass, and forming a shield oxygen layer between the combustion zone and the molten glass to shield the molten glass from the water vapor of the combustion reaction products; and D) reacting some shield oxygen with molten glass to make the molten glass more oxidizing.

2. The method of claim 1 wherein the shield oxygen is provided into the furnace at a velocity not exceeding 10 feet per second.

3. The method of claim 1 wherein the shield oxygen flow in the furnace is laminar.

4. The method of claim 1 wherein the fuel and oxidant are provided into the furnace in a fuel-rich ratio.

5. The method of claim 1 wherein the fuel and oxidant are provided into the furnace at a mass average velocity less than 50 feet per second.

6. A glassmelting method enabling reduced volatilization of alkali species comprising:

A) providing glassmaking materials including alkali species into a glassmelting furnace;

B) providing fuel and oxidant into the furnace, combusting them therein to generate heat and combustion reaction products including water vapor in a combustion zone within the furnace, and radiating heat from the combustion reaction products to the glassmaking materials to form molten glass;

C) providing reducing gas comprising carbon monoxide and hydrogen within the furnace at a velocity not exceeding 50 feet per second at a point between the combustion zone and the molten glass, and forming a reducing gas layer between the combustion zone and the molten glass to shield the molten glass from the water vapor of the combustion reaction products; and D) reacting some reducing gas with molten glass to make the molten glass more reducing.

7. A glassmelting method enabling reduced volatilization of alkali species comprising:

A) providing glassmaking materials including alkali species into a glassmelting furnace having an oxidizing zone and a reducing zone;

B) providing fuel and oxidant into the furnace, combusting them therein to generate heat and combustion reaction products including water vapor in a combustion zone within the furnace, and radiating heat from the combustion reaction products to the glassmaking materials to form molten glass;

C) providing shield oxygen into the oxidizing zone of the furnace at a velocity not exceeding 50 feet per second at a point between the combustion zone and the molten glass, and forming a shield oxygen layer between the combustion zone and the molten glass to shield the molten glass from the water vapor of the combustion reaction products; and D) providing reducing gas comprising carbon monoxide and hydrogen within the reducing zone of the furnace at a velocity not exceeding 50 feet per second at a point between the combustion zone and the molten glass, and forming a reducing gas layer between the combustion zone and the molten glass to shield the molten glass from the water vapor of the combustion reaction products.

8. The method of claim 7 wherein some shield oxygen reacts with molten glass in the oxidizing zone of the furnace.

9. The method of claim 7 wherein some reducing gas reacts with molten glass in the reducing zone of the furnace.

* * * * *